(12) United States Patent
Nakamura et al.

(10) Patent No.: US 11,471,945 B2
(45) Date of Patent: Oct. 18, 2022

(54) LAMINATION MOLDING APPARATUS

(71) Applicant: SODICK CO., LTD., Kanagawa (JP)

(72) Inventors: Naoto Nakamura, Kanagawa (JP); Shuji Okazaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 84 days.

(21) Appl. No.: 17/031,950

(22) Filed: Sep. 25, 2020

(65) Prior Publication Data
US 2021/0114096 A1    Apr. 22, 2021

(30) Foreign Application Priority Data

Oct. 18, 2019   (JP) .............................. JP2019-191481

(51) Int. Cl.
*B22F 10/00*   (2021.01)
*B23K 37/00*   (2006.01)
(Continued)

(52) U.S. Cl.
CPC .............. *B22F 10/00* (2021.01); *B22F 12/20* (2021.01); *B23K 37/003* (2013.01);
(Continued)

(58) Field of Classification Search
CPC ..... B29C 64/214; B29C 64/223; B29C 64/35; B29C 64/357; B29C 64/153; B29C 64/218; B22F 12/60; B22F 12/67; B22F 12/20; B22F 3/1055; B22F 2003/1056; B22F 2003/1057; B22F 2003/1058; B22F 2003/1059; B22F 10/20; B22F 2999/00; B22F 12/52; B22F 10/32; B22F 12/17; B22F 12/30; B22F 12/41; B22F 10/00;
(Continued)

(56) References Cited

U.S. PATENT DOCUMENTS 10,994,332 B2 * 5/2021 Saito ....................... B29C 64/20
2007/0132157 A1 * 6/2007 Tokita ................... G03F 7/0002
264/494
(Continued)

FOREIGN PATENT DOCUMENTS

CN   207709867   8/2018
JP   4856908     1/2012
(Continued)

*Primary Examiner* — Philip C Tucker
*Assistant Examiner* — Jimmy R Smith, Jr.
(74) *Attorney, Agent, or Firm* — JCIPRNET

(57) ABSTRACT

A lamination molding apparatus includes: a material layer forming device that forms a material layer in a molding region; an irradiator that sinters or melts the material layer to form a solidified layer; and a cooling device that cools, to a cooling temperature, at least a part including an upper surface of a solidified body. The material layer forming device includes: a base having the molding region, a recoater head disposed on the base, a recoater head driving device that reciprocates the recoater head in a horizontal direction, and a blade that is arranged on the recoater head and that levels material powder to form the material layer. The cooling device includes: a cooling body that is controlled to the cooling temperature and comes into contact with the upper surface of the solidified body, and a mounting member that mounts the cooling body to the recoater head.

9 Claims, 9 Drawing Sheets

(51) Int. Cl.
    *B22F 12/20*     (2021.01)
    *B29C 64/218*     (2017.01)
    *B22F 10/10*     (2021.01)
    *B33Y 30/00*     (2015.01)
    *B23K 103/04*     (2006.01)
    *B23K 26/342*     (2014.01)
    *B23K 15/00*     (2006.01)
    *B22F 12/63*     (2021.01)
    *B22F 12/60*     (2021.01)

(52) U.S. Cl.
    CPC ............ *B29C 64/218* (2017.08); *B22F 10/10* (2021.01); *B22F 12/60* (2021.01); *B22F 12/63* (2021.01); *B23K 15/0086* (2013.01); *B23K 26/342* (2015.10); *B23K 2103/04* (2018.08); *B33Y 30/00* (2014.12)

(58) Field of Classification Search
    CPC .......... B22F 10/10; B22F 10/28; B22F 12/49; B22F 12/90; B22F 12/63; B23K 15/0086; B23K 2103/04; B23K 26/342; B23K 37/003; B33Y 30/00; B33Y 50/02; Y02P 10/25

See application file for complete search history.

(56) References Cited

U.S. PATENT DOCUMENTS

| | | | |
|---|---|---|---|
| 2010/0247742 | A1* | 9/2010 | Shi .................. B33Y 30/00 118/712 |
| 2017/0173696 | A1* | 6/2017 | Sheinman ............... B22F 12/13 |
| 2018/0333911 | A1* | 11/2018 | Lin ....................... B29C 64/393 |
| 2019/0061001 | A1 | 2/2019 | Araie et al. |

FOREIGN PATENT DOCUMENTS

| | | |
|---|---|---|
| JP | 2019038139 | 3/2019 |
| JP | 2019044210 | 3/2019 |
| JP | 2019099856 | 6/2019 |

* cited by examiner

LAMINATION MOLDING APPARATUS

CROSS-REFERENCE TO RELATED APPLICATION

This application claims the priority benefit of Japan Application No. 2019-191481, filed on Oct. 18, 2019. The entirety of the above-mentioned patent application is hereby incorporated by reference herein and made a part of this specification.

BACKGROUND

Technical Field

The disclosure relates to a lamination molding apparatus.

Related Art

In a metal lamination molding method referred to as powder bed fusion, first, a material layer made of metal material powder is formed. Next, a beam such as a laser beam or an electron beam is irradiated to a predetermined position of the material layer, and the material layer at the irradiation position is sintered or melted. By repeating the formation of the material layer and the irradiation of the beam, a plurality of sintered layers or melted layers is laminated and a desired three-dimensional molded object is molded. Hereinafter, the sintering and the melting are collectively referred to as solidifying, and the sintered layer and the melted layer are collectively referred to as solidified layer. In addition, the laminated solidified layers are referred to as a solidified body.

The material layer is formed by leveling the material powder with a blade. The blade is mounted to a recoater head, and the recoater head is moved by a recoater head driving device on a molding region serving as a region in which the desired three-dimensional molded object is formed. Along with the movement of the recoater head, the blade spreads the material powder on the molding region and forms a material layer having a predetermined thickness.

In this lamination molding, the temperature may be adjusted for the three-dimensional molded object after molding or the solidified layer during molding. For example, US2019061001A1 discloses a lamination molding method in which every time one or more solidified layers are formed, temperature control is performed on the solidified layer to intentionally advancing martensitic transformation of the solidified layer. Thus, molding of a three-dimensional molded object is performed together with the advancing martensitic transformation by the temperature control.

In the lamination molding in which temperature control is performed on the solidified layer, it may be more efficient to adjust the temperature from an upper surface of the solidified body. For example, when the solidified layer to be cooled is located at the upper part of the solidified body, it is preferable to cool from the upper surface of the solidified body. In addition, a cooling device that cools the solidified layer preferably has a simple and small configuration. For example, the cooling device desirably shares a driving device with other devices.

The disclosure provides a lamination molding apparatus capable of efficiently cooling a solidified body by a cooling device having a relatively simple and small structure.

SUMMARY

According to one embodiment of the disclosure, a lamination molding apparatus is provided, which includes: a material layer forming device that forms a material layer in a molding region in which a desired three-dimensional molded object is formed; an irradiator that sinters or melts the material layer by irradiating a laser beam or an electron beam and forms a solidified layer; and a cooling device that cools, to a predetermined cooling temperature, at least a part including an upper surface of a solidified body obtained by laminating the solidified layer. The material layer forming device includes: a base having the molding region, a recoater head disposed on the base, a recoater head driving device that reciprocates the recoater head in a horizontal direction, and a blade that is arranged on the recoater head and that levels material powder to form the material layer. The cooling device includes: a cooling body that is controlled to the cooling temperature and comes into contact with the upper surface of the solidified body, and a mounting member that mounts the cooling body to the recoater head.

DESCRIPTION OF THE EMBODIMENTS

According to one aspect of the disclosure, the cooling body which is controlled to the predetermined cooling temperature is arranged on the recoater head, and the recoater head driving device is used to move the cooling body in the horizontal direction. The cooling body comes into contact with the upper surface of the solidified body and cools the solidified body from the upper side. With this configuration, it is not necessary to separately arrange a driving device for movement of the cooling body in the horizontal direction, and the cooling device can have a relatively simple and small configuration. In addition, because the solidified body can be cooled from the upper side, the solidified body can be efficiently cooled.

Embodiments of the disclosure are described below with reference to the drawings. The various features shown in the embodiments described below may be combined with each other.

Figure 1:
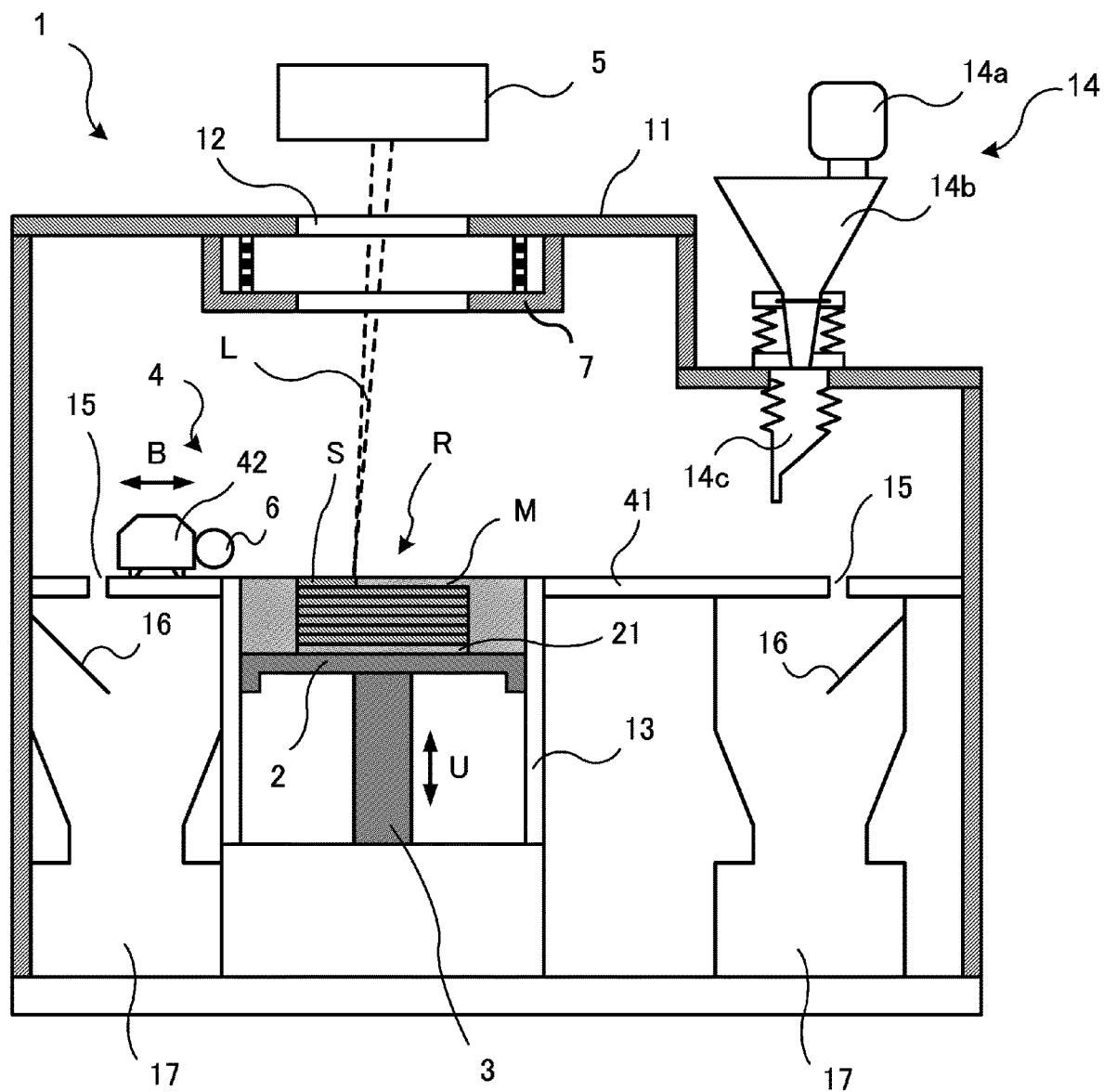
FIG. 1 is a schematic configuration view of a lamination molding apparatus according to an embodiment of the disclosure.

As shown in FIG. 1, a lamination molding apparatus 1 includes a chamber 11, a material layer forming device 4, an irradiator 5, and a cooling device 6.

The chamber 11 covers a molding region R serving as a region in which a desired three-dimensional molded object is formed. The chamber 11 is supplied with an inert gas having a predetermined concentration and discharges an inert gas containing fumes generated when a material layer M is solidified. The inert gas discharged from the chamber 11 are preferably returned to the chamber 11 with the fumes removed. Specifically, an inert gas supplier that is not shown and a fume collector that is not shown are connected to the chamber 11. Besides, in the disclosure, the inert gas refers to a gas that does not substantially react with the material layer M or a solidified layer S, and is appropriately selected from a nitrogen gas, an argon gas, a helium gas, and the like according to the type of the material.

The inert gas supplier is a device configured to supply an inert gas and is, for example, an inert gas generator that generates an inert gas having a predetermined concentration from ambient air or a gas cylinder in which an inert gas having a predetermined concentration is stored. As the inert gas generator, various types such as a membrane separation type, a PSA type, and the like can be employed therefor according to the type and the concentration of the generated inert gas. The inert gas supplier performs inert gas supply in the chamber 11 and fills the chamber 11 with the inert gas having the predetermined concentration. Here, the inert gas supplied from the inert gas supplier is desirably dry. Specifically, a dew point temperature of the inert gas is desirably lower than a cooling temperature of the cooling device 6. Because a cooling body 61 of the cooling device 6 described later moves in the chamber 11, it is possible to suppress dew condensation on the cooling body 61 if the chamber 11 is filled with a dry inert gas. That is, when the inert gas supplier is the inert gas generator, the inert gas generator desirably includes a drying device that dries air serving as a raw material for generating the inert gas. In addition, when the inert gas supplier is the gas cylinder, it is desirable that a sufficiently dry inert gas be stored in the gas cylinder.

The fume-rich inert gas discharged from the chamber 11 is sent to a fume collector, and returned to the chamber 11 after the fumes are removed. The fume collector is a device configured to remove fumes and is, for example, an electrostatic precipitator or a filter.

The material layer forming device 4 flattens the material powder on the molding region R to form the material layer M having a predetermined thickness. The material layer forming device 4 includes a base 41, a recoater head 42, a recoater head driving device 44, and a blade 424. The base 41 is arranged in the chamber 11 and has the molding region R.

A molding table 2 is disposed in the molding region R. The molding table 2 can be moved in a vertical direction (direction of an arrow U) by a molding table driving device 3. When the three-dimensional molded object is formed, a base plate 21 may be placed on the molding table 2. At this time, the first material layer M is formed on the base plate 21. Powder holding walls 13 are arranged around the molding table 2. Unsolidified material powder is held in a material holding space surrounded by the powder holding walls 13 and the molding table 2.

Figure 2:
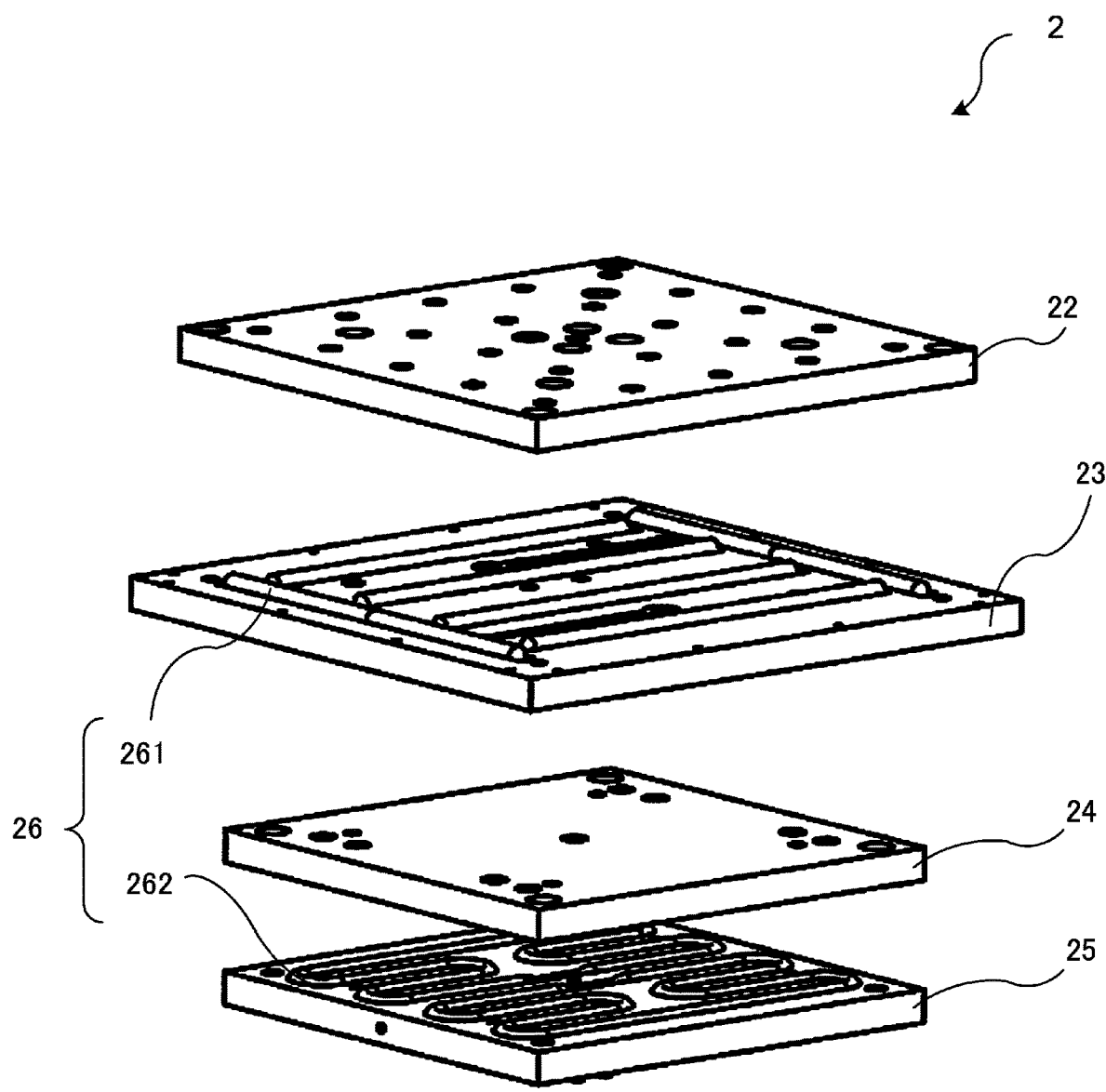
FIG. 2 is a schematic configuration view of a molding table.

As shown in FIG. 2, the molding table 2 has a top plate 22, a supporting plate 23, a supporting plate 24, and a supporting plate 25, and these plates are stacked to constitute the molding table 2. In addition, a temperature control mechanism 26 for controlling a temperature of the molding table 2 is arranged inside the molding table 2. The temperature control mechanism 26 has a heater 261 and a cooler 262 that are arranged inside the molding table 2. The heater 261 is, for example, a heating element such as an electric heater or a pipeline through which a heating medium flows. The cooler 262 is, for example, a pipeline through which a cooling medium flows. Various fluids such as water or oil may be used as the heating medium or the cooling medium. Besides, the cooler 262 of the temperature control mechanism 26 may have a structure in which a certain degree of cooling can be performed, or may be a cooler in which cooling can be performed to a temperature higher than the cooling temperature of the cooling device 6 described later. For example, the cooler 262 can cool the molding table 2 to room temperature.

As the molding table driving device 3, a device including an arbitrary actuator capable of reciprocating the molding table 2 in the direction of the arrow U can be employed. In the embodiment, the molding table driving device 3 includes a slide base arranged under the molding table 2, a ball screw, and a guide base that supports the ball screw. The ball screw includes a screw shaft rotated by a motor and a nut screwed with the screw shaft via balls. The nut is fixed to the side surface of the slide base.

Figure 3:
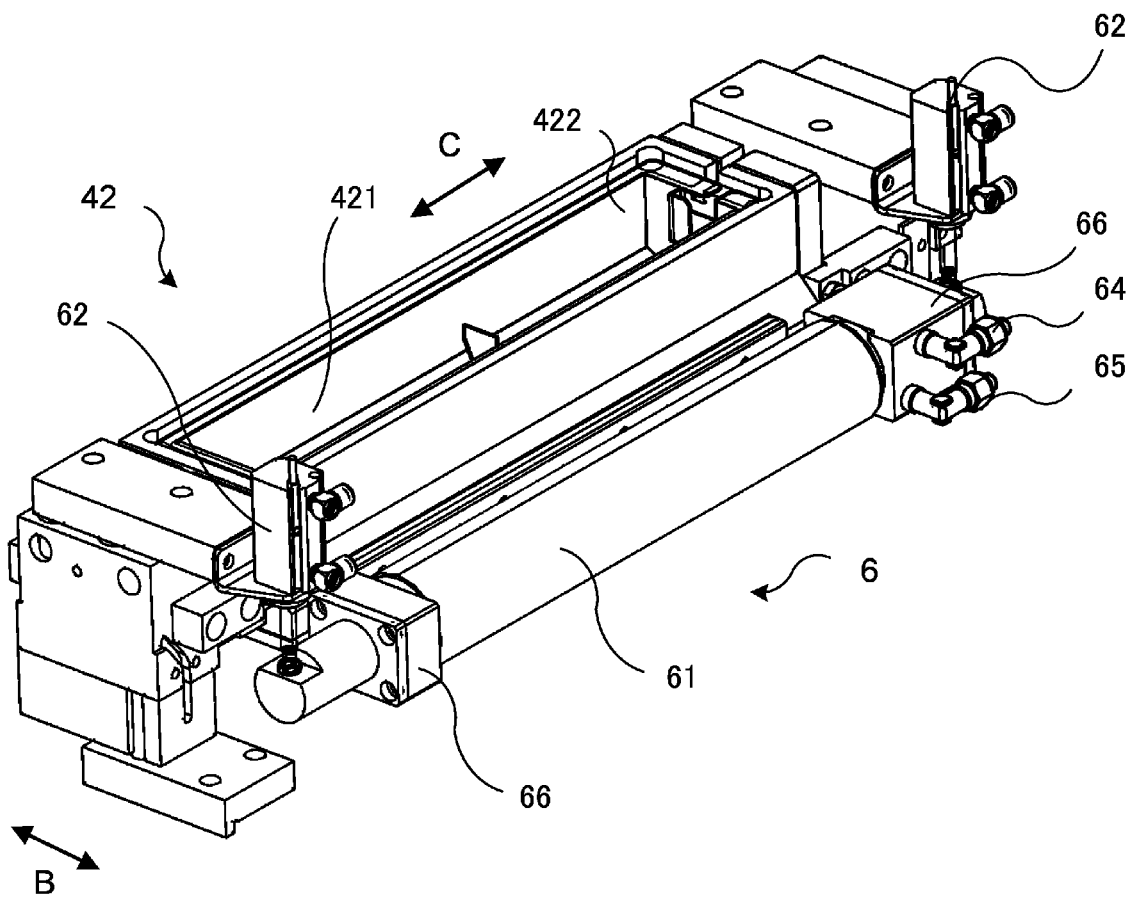
FIG. 3 is a perspective view of a recoater head and a cooling device from above.
Figure 4:
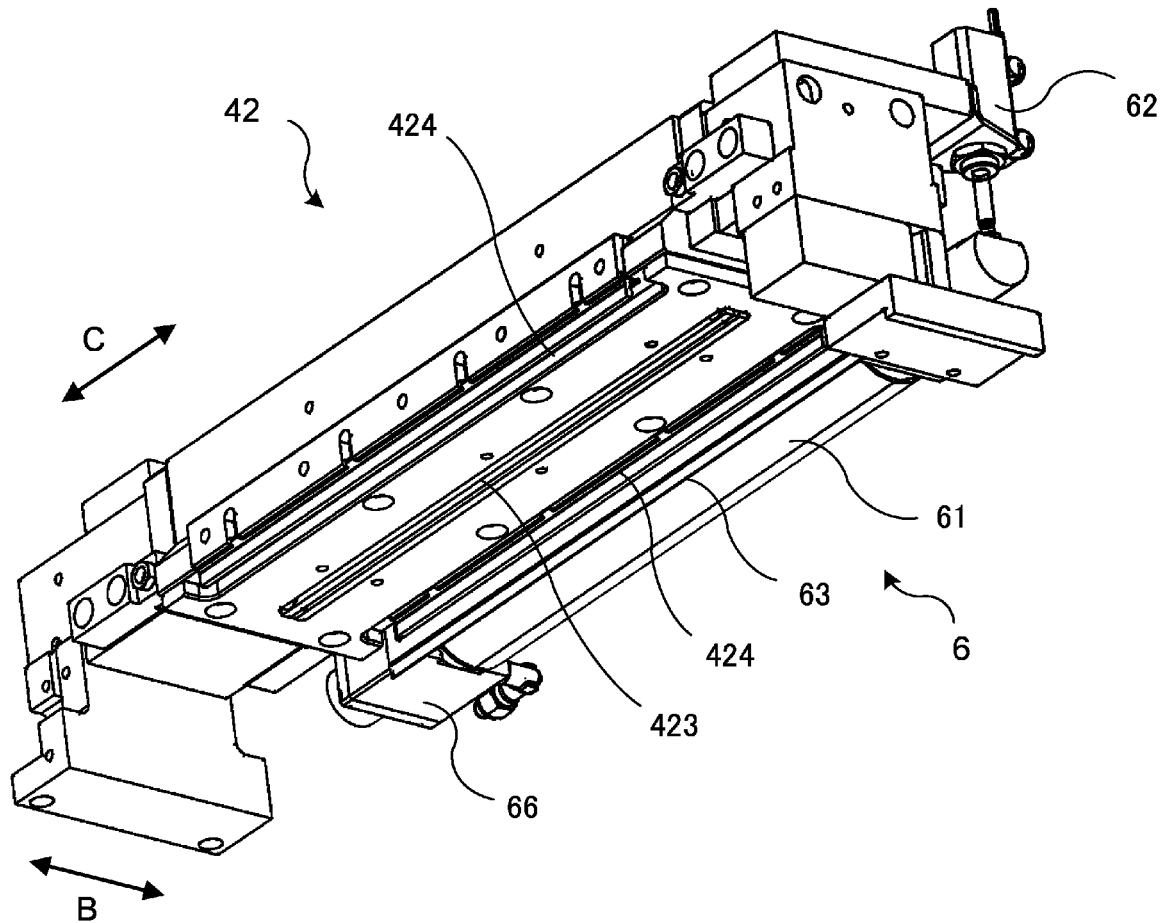
FIG. 4 is a perspective view of the recoater head and the cooling device from below.

The recoater head 42 is disposed on the base 41 and is reciprocated in a horizontal one axis direction (direction of an arrow B) by the recoater head driving device 44. The recoater head 42 has a function of moving at least the blade 424 in the direction of the arrow B. Moreover, the recoater head 42 of the embodiment has a function of storing the material powder which becomes the material layer M and discharging the material powder to the molding region R. As shown in FIGS. 3 and 4, the recoater head 42 has a material container 421, a material supply opening 422, and a material discharge opening 423, and the blade 424 is arranged on a side surface of the recoater head 42.

The material container 421 accommodates the material powder supplied from a material supplier 14. The material supply opening 422 is arranged on an upper surface of the material container 421 and serves as a port for receiving the material powder supplied from the material supplier 14 to the material container 421. The material discharge opening 423 is arranged on a bottom surface of the material container 421 and discharges the material powder in the material container 421. In addition, the material discharge opening 423 has a slit shape. A longitudinal direction of the slit shape is a horizontal direction (direction of an arrow C) orthogonal to the direction of the arrow B which is the moving direction of the recoater head 42. The recoater head 42 reciprocates in the direction of the arrow B on the molding region R, and discharges the material powder from the material discharge opening 423 at this time.

The blade 424 is arranged on the side surface of the recoater head 42. The blade 424 reciprocates on the molding region R together with the recoater head 42 so as to level the material powder discharged from the recoater head 42 to the molding region R and form the material layer M. In the embodiment, one blade 424 is arranged on each side surface of the recoater head 42, but at least one blade 424 may be mounted on the recoater head 42. In addition, as the blade 424, various forms such as a flat plate-shaped blade, a flexible blade, a brush-shaped blade, a roller-shaped blade, and the like may be employed as long as the material layer M having a predetermined thickness can be formed.

As the recoater head driving device 44, a device including any actuator capable of reciprocating the recoater head 42 along the direction of the arrow B may be employed. In the embodiment, the recoater head driving device 44 includes a motor, a ball screw, and a pair of guides. The ball screw has a screw shaft rotated by the motor, and a nut screwed with the screw shaft via balls and connected to the recoater head 42. The guides are arranged on the base 41 and extend in the direction of the arrow B. The recoater head 42 is guided by the guides and moved in the direction of the arrow B.

The material supplier 14 is arranged above one end of the base 41 in the direction of the arrow B to penetrate the chamber 11. The material supplier 14 includes a bottle 14*a* in which the material powder is stored, a hopper 14b that receives the material powder supplied from the bottle 14a, and a duct 14c that is connected to the hopper 14b and guides the material powder to the recoater head 42. When the material powder is replenished to the recoater head 42, the recoater head 42 is moved below the material supplier 14. Then, the duct 14c is lowered, and the front end of the duct 14c is inserted into the material container 421 from the material supply opening 422. A shutter is opened in this state, the material powder supplied from the bottle 14a to the hopper 14b is freely dropped by a predetermined amount, and the material powder is replenished into the material container 421. Besides, the material supplier 14 is not limited to the above embodiment as long as the material supplier can supply the material powder to the recoater head 42.

The material used in the lamination molding apparatus 1 of the embodiment is, for example, metal material powder. In particular, when temperature control is performed on the solidified layer S every time a predetermined number of solidified layers S are formed to intentionally advance the martensitic transformation of the solidified layer S and the three-dimensional molded object is molded at the same time, it is preferable to use a material such as martensitic stainless steel or carbon steel that is relatively susceptible to martensitic transformation.

A material collect opening 15 is formed at the end of the base 41 in the direction of the arrow B, specifically, at a position closer to an at least outer side than the molding region R in the direction of the arrow B. In this embodiment, one material collect opening 15 is arranged at each end of the base 41, but the material collect opening 15 may be arranged only at one end. The material collect opening 15 is an opening through which the material powder can pass, and the material powder dropped from the material collect opening 15 is guided by a chute 16 and stored in a bucket 17. The material powder collected in the bucket 17 may be reused. Excess material powder not retained in the material holding space above the molding table 2 is discharged from the material collect opening 15 by moving the recoater head 42 to the vicinity of the material collect opening 15. In addition, by moving the recoater head 42 onto the material collect opening 15, the material powder accommodated in the material container 421 of the recoater head 42 can be discharged from the material discharge opening 423, and the inside of the material container 421 can be substantially empty.

Figure 6:
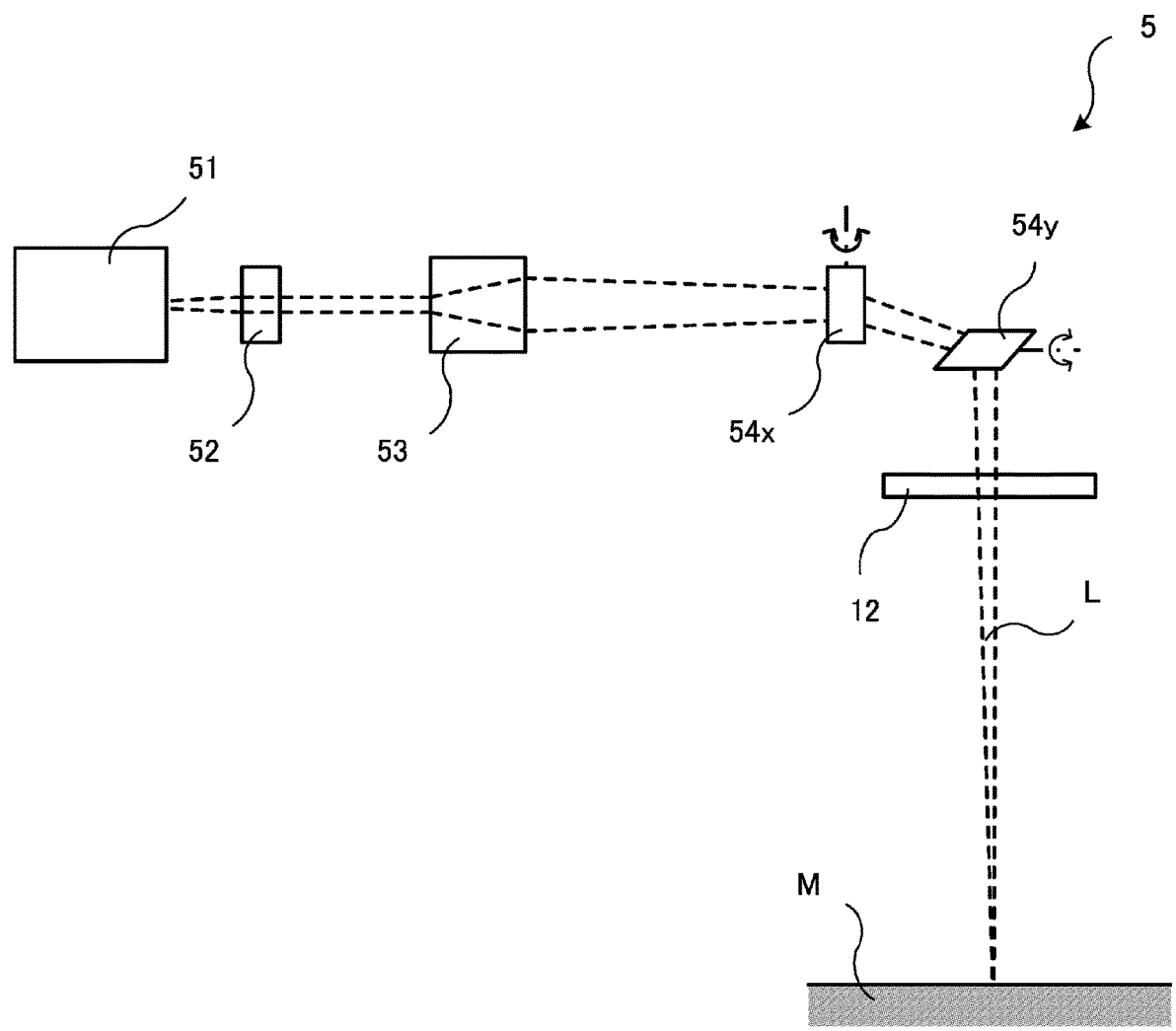
FIG. 6 is a schematic configuration view of an irradiator.

The irradiator 5 irradiates the material layer M with a laser beam L to sinter or melt the material layer M and forms the solidified layer S. As shown in FIG. 6, The irradiator 5 has an output source 51, a collimator 52, a focus control unit 53, and a scanner.

The output source 51 outputs the laser beam L. The laser beam L can sinter or melt the material layer M and is, for example, a $CO_2$ laser, a fiber laser, or a YAG laser. The collimator 52 converts the laser beam L output from the output source 51 into parallel light. The focus control unit 53 condenses the laser beam L converted into parallel light by the collimator 52 and adjusts the laser beam L to a predetermined spot diameter.

The scanner scans the laser beam L output from the output source 51 to a desired position of the material layer M on the molding table 2. Specifically, the scanner is a galvano scanner having a pair of galvano mirrors $54x$ and $54y$ and actuators $56x$ and $56y$ that respectively rotate the galvano mirrors $54x$ and $54y$. The irradiation position of the laser beam L is controlled by controlling the rotation angles of the galvano mirror $54x$ and the galvano mirror $54y$.

The laser beam L whose irradiation position is controlled by the galvano mirror $54x$ and the galvano mirror $54y$ is irradiated to the material layer M on the molding table 2 through a window 12 arranged on an upper surface of the chamber 11, and the solidified layer S is formed. The window 12 is formed of a material that can transmit the laser beam L. For example, when the laser beam L is a fiber laser or a YAG laser, the window 12 can be made of quartz glass.

A pollution prevention device 7 is arranged on the upper surface of the chamber 11 so as to cover the window 12. The pollution prevention device 7 fills an underside of the window 12 with the inert gas to prevent the pollution of the window 12, and ejects the inert gas downward to remove fumes from a path of the laser beam L.

The irradiator 5 of the embodiment is configured to irradiate the laser beam L to form the solidified layer S, but the irradiator may also irradiate an electron beam. For example, the irradiator may include a cathode electrode that emits electrons, an anode electrode that converges and accelerates the electrons, a solenoid that forms a magnetic field to converge the direction of the electron beam in one direction, and a collector electrode that is electrically connected to the material layer M serving as an irradiation target and that applies a voltage between the collector electrode and the cathode electrode. At this time, the cathode electrode and the anode electrode play a role of an output source that outputs an electron beam, and the solenoid plays a role of a scanner that scans the electron beam. Besides, the window 12 and the pollution prevention device 7 may be omitted, and the cathode electrode may be arranged to protrude into the chamber 11. In addition, when an irradiator that irradiates an electron beam is used, the atmosphere in the chamber 11 may be in a noble gas atmosphere in a state close to vacuum.

The lamination molding apparatus 1 may further include a first machining device that performs cutting on end surfaces of the solidified layer S every time a predetermined number of solidified layers S are formed. The first machining device includes a first machining head and a first machining head driving device for driving the first machining head. The first machining head driving device has an X-axis driving unit, a Y-axis driving unit, and a Z-axis driving unit. The X-axis driving unit is disposed on the base 41 and moves the Y-axis driving unit in the X-axis direction. The Y-axis driving unit moves the first machining head disposed in the chamber 11 in the Y-axis direction. The Z-axis driving unit moves the first machining head in the Z-axis direction. The first machining head includes a spindle head. The spindle head is configured to be capable of gripping and rotating a cutting tool such as an end mill, and can perform cutting on the surface or unnecessary portions of the solidified layer S.

In addition, the lamination molding apparatus 1 may further include, instead of the first machining device, a second machining device that cuts a reference surface in the secondary machining on the upper surface and the side surfaces of the three-dimensional molded object subjected to lamination molding. The second machining device may include a second machining head and a second machining head driving device for horizontally driving the second machining head. The second machining head has a turning mechanism that grips a cutting tool such as a turning tool and rotates the cutting tool along a vertical rotation axis. The second machining head driving device has, for example, a pair of first horizontal movement mechanisms, a gantry arranged in the pair of first horizontal movement mechanisms, and a second horizontal movement mechanism which is mounted on the gantry and to which the second machining head is fixed. At this time, the second machining head driving device may not have a driving device that moves the second machining head in the Z-axis direction.

Figure 5:
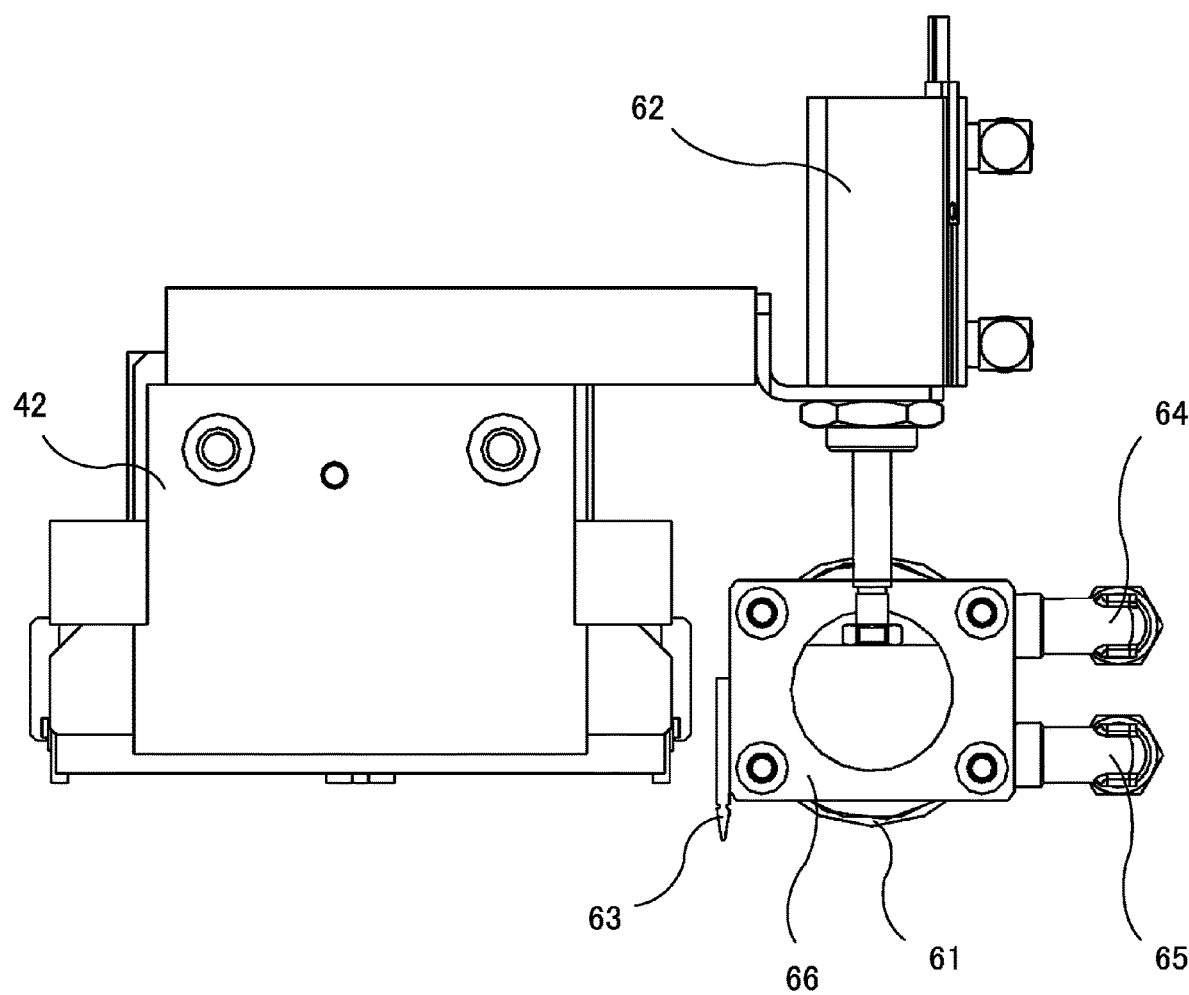
FIG. 5 is a side view of the recoater head and the cooling device.

The cooling device 6 cools, to the predetermined cooling temperature, at least a part including the upper surface of the solidified body obtained by laminating the solidified layer S. Hereinafter, the at least a part including the upper surface of the solidified body to be cooled is referred to as an upper surface layer. As shown in FIGS. 3 to 5, the cooling device 6 includes a cooling body 61, an elevator 62, a wiper 63, a cooling medium inlet 64, a cooling medium outlet 65, and a mounting member 66.

The cooling body 61 is arranged on the recoater head 42 via the mounting member 66, and a temperature of the cooling body 61 is controlled to the cooling temperature when the upper surface layer is cooled. Then, the cooling body 61 cools the upper surface layer by coming into contact with the upper surface of the solidified body. In the embodiment, the cooling body 61 has a cylindrical shape and is configured to be rotatable. The cooling body 61 is rotatably supported by the mounting member 66 connected to the recoater head 42, and rotates while being in contact with the upper surface of the solidified body along with the movement of the recoater head 42. Hereinafter, the cooling body 61 having the cylindrical shape and rotatably configured in this way is particularly referred to as a cooling roller. If the surface of the cooling roller is made of a raw material having elasticity to some extent, the cooling roller can be pressed against the upper surface of the solidified body and moved while a predetermined contact area is secured, which is preferable. For example, a heat conductive sheet having elasticity may be attached to a surface of the cooling roller. The heat conductive sheet is, for example, acrylic resin or silicone rubber in which a heat conductive filler is kneaded. Besides, the cooling body 61 of the cooling device 6 may be a metal having high heat dissipation performance, for example, a heat sink having fins. However, by using the cooling body 61 as the cooling roller that rotates while being in contact with the upper surface of the solidified body, cooling can be performed while the cooling roller is moved, and the cooling body 61 can be downsized. As a result, the cooling efficiency of the cooling body 61 is good, and the cooling device 6 can be made smaller.

The wiper 63 is arranged on the recoater head 42. More specifically, the wiper 63 is mounted on the mounting member 66 connected to the recoater head 42. The wiper 63 is preferably a flat-plate shaped wiper having flexibility or a brush shaped wiper. In addition, a lower end of the wiper 63 is located below a lower end of the cooling roller that is the cooling body 61. The wiper 63 is moved while being in contact with the upper surface of the solidified body along with the movement of the recoater head 42, and removes the material powder from the upper surface of the solidified body. Preferably, the wiper 63 removes the material powder from at least a part of the side surface of the solidified body along with the movement of the recoater head 42. When the material powder is present on the solidified body or on the side surface of the solidified body during cooling, not only the contact of the cooling body 61 with the solidified body is interfered, but a decrease in cooling efficiency is also caused by the thermal energy stored in the material powder. Therefore, by wiping the material powder from the upper surface of the solidified body and the at least a part of the side surface of the solidified body with the wiper 63 and then performing cooling by the cooling body 61, the upper surface layer can be efficiently cooled. Besides, the wiper 63 is arranged only on one side surface of the mounting member 66 in the embodiment, but one wiper 63 may be arranged on each side surface of the mounting member 66.

The elevator 62 is any actuator that raises and lowers the cooling body 61. For example, an air cylinder is used as the elevator 62. The elevator 62 raises the cooling body 61 and keeps the cooling body 61 and the material layer M in a non-contact state when the material layer forming device 4 forms the material layer M. In addition, the elevator 62 lowers the cooling body 61 and keeps the cooling part 61 and the solidified body in a contact state when the upper surface layer is cooled. With this configuration, it is possible to prevent the cooling body 61 from interfering with the formation of the material layer M.

The cooling medium inlet 64 and the cooling medium outlet 65 are respectively an inlet and an outlet of a pipeline 611 which is arranged inside the cooling body 61 and through which a cooling medium flows. The cooling medium inlet 64 and the cooling medium outlet 65 are respectively connected to a chiller (not shown) that circulates the cooling medium via a pipe (not shown). A solenoid valve 68 for turning on/off the supply of the cooling medium is arranged in the pipe. The cooling medium whose temperature has been controlled to the predetermined cooling temperature in the chiller flows into the pipeline 611 from the cooling medium inlet 64, and returns to the chiller from the cooling medium outlet 65 through the pipeline 611. Various fluids such as water, oil, antifreeze liquid such as ethylene glycol, and liquefied nitrogen may be used as the cooling medium.

Figure 7:
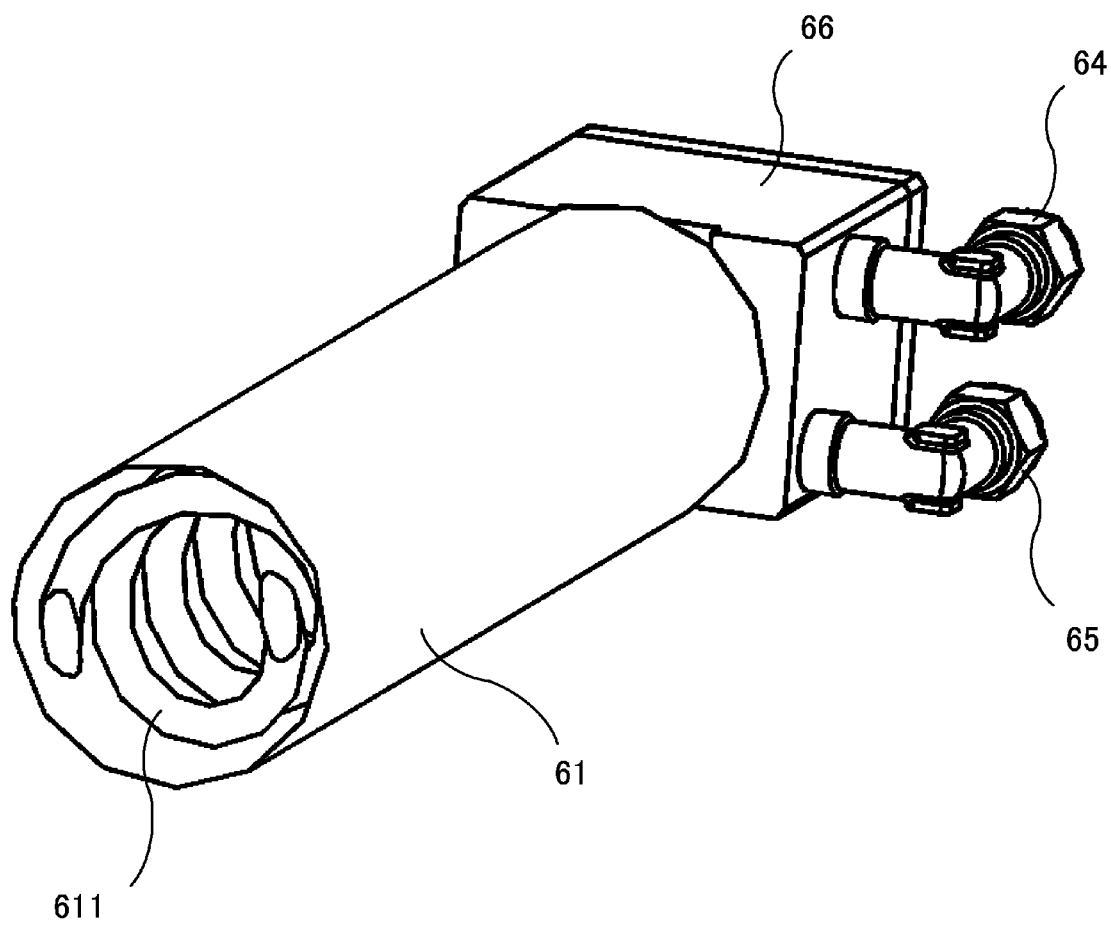
FIG. 7 is a cross-sectional perspective view of a cooling body.

In addition, the pipeline 611 arranged inside the cooling body 61 preferably has a spiral shape as shown in FIG. 7. According to the pipeline 611, the cooling body can be cooled more efficiently.

In addition, a temperature sensor that measures the temperature of the upper surface of the solidified body may be arranged. The temperature sensor may be arranged at any position in the lamination molding apparatus 1 and is arranged on the first machining head or the second machining head for example. When the temperature sensor is a contact type temperature sensor, a driving device such as an air cylinder that moves the temperature sensor up and down may be further arranged. The temperature of the upper surface of the solidified body is measured after the cooling performed by the cooling device 6, and the cooling performed by the cooling device 6 may be performed again if the temperature does not reach the predetermined cooling temperature. In addition, the cooling performed by the cooling device 6 may be performed while the temperature of the upper surface of the solidified body is measured, and the cooling may be continued until the temperature reaches the predetermined cooling temperature.

Figure 8:
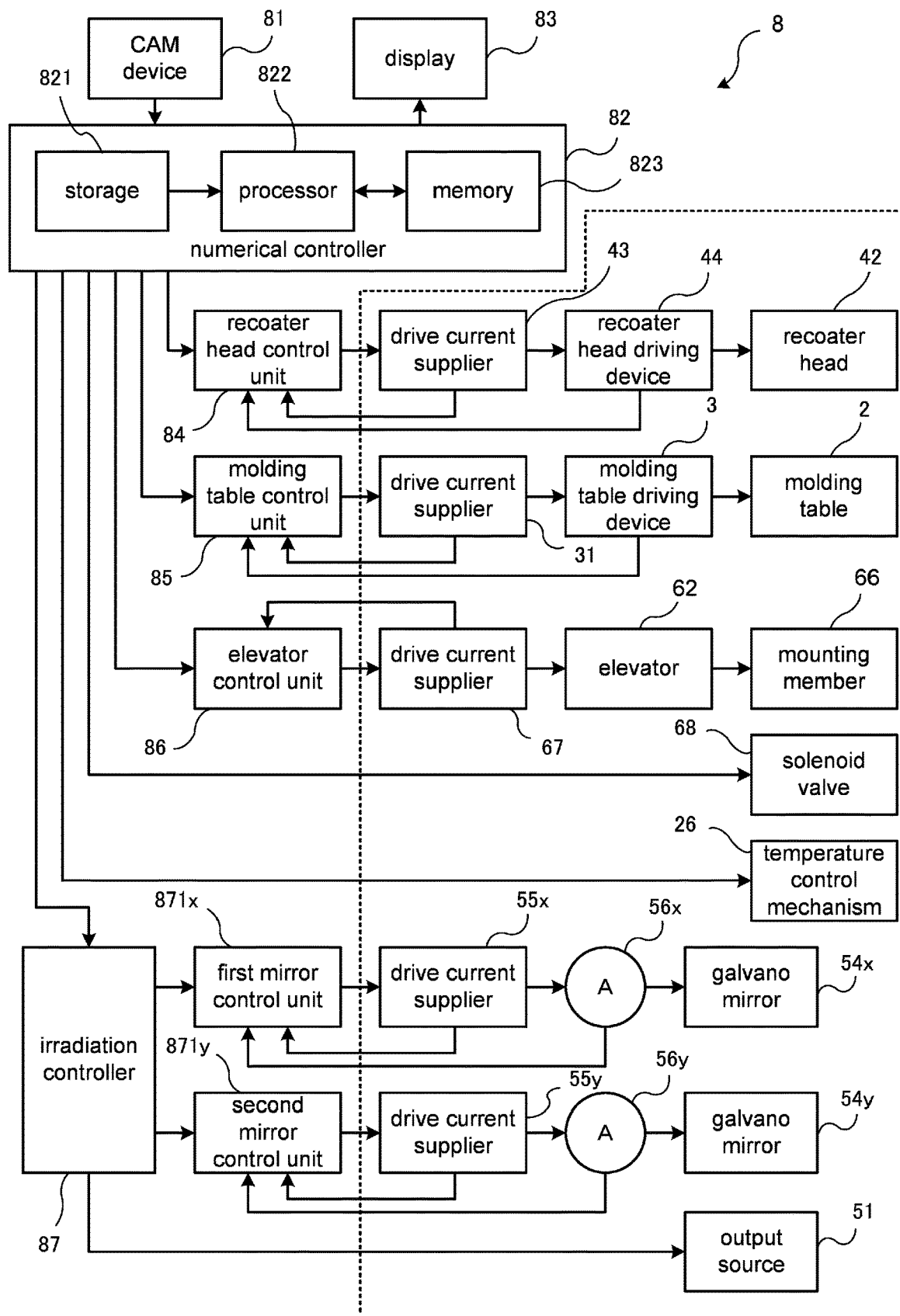
FIG. 8 is a block diagram of a control device.

A control device 8 that controls the lamination molding apparatus 1 is described. As shown in FIG. 8, the control device 8 includes a numerical controller 82, a display 83, a recoater head control unit 84, a molding table control unit 85, an elevator control unit 86, an irradiation controller 87, a first mirror control unit 871x, and a second mirror control unit 871y. The control device 8 controls at least the molding table driving device 3, the material layer forming device 4, the temperature control mechanism 26, the cooling device 6, and the irradiator 5 of the lamination molding apparatus 1.

A CAM device 81 creates a project file including a main program and a molding program for forming the desired three-dimensional molded object. The main program is composed of a plurality of program lines with sequence numbers, and each program line includes a command for sintering or melting in a predetermined layer. In addition, the molding program is an irradiation program file and includes commands for the irradiation position of the laser beam L.

The numerical controller 82 controls, according to the project file created by the CAM device 81, the material layer forming device 4, the height and the temperature of the molding table 2, the temperature and the position of the cooling body 61 of the cooling device 6, the irradiator 5, and the like, and forms the desired three-dimensional molded object. The numerical controller 82 has a storage 821, a processor 822, and a memory 823.

The storage 821 stores the project file acquired from the CAM device 81 via a communication line or a portable storage medium.

The processor 822 executes, according to the project file stored in the storage device 821, arithmetic processing for controlling the material layer forming device 4, the height and the temperature of the molding table 2, the temperature and the position of the cooling body of the cooling device 6, the irradiator 5, and the like.

The memory 823 temporarily stores numerical values or data that need to be temporarily stored in a process of the arithmetic processing executed by the processor 822.

The display 83 is connected to the numerical controller 82 and displays data, error messages, or the like notified by the numerical controller 82.

The recoater head control unit 84 controls the recoater head 42 based on a command from the numerical controller 82. The command from the recoater head control unit 84 is input to a drive current supplier 43. The drive current supplier 43 outputs electric power according to the command, and thereby the motor of the recoater head driving device 44 rotates. In this way, the recoater head 42 reciprocates on the base 41. In addition, a signal according to the output of the drive current supplier 43 and a signal from an encoder or the like mounted on the motor are input to the recoater head control unit 84. The recoater head control unit 84 performs feedback control based on these signals.

The molding table control unit 85 controls the molding table driving device 3 based on a command from the numerical controller 82. The command from the molding table control unit 85 is input to a drive current supplier 31. The drive current supplier 31 outputs electric power according to the command, and thereby the motor of the molding table driving device 3 rotates. In this way, the molding table 2 moves upward or downward, and the height of the molding table 2 changes. In addition, a signal according to the output of the drive current supplier 31 and a signal from an encoder or the like mounted on the motor are input to the molding table control unit 85. The molding table control unit 85 performs feedback control based on these signals.

The elevator control unit 86 controls the elevator 62 of the cooling device 6 based on a command from the numerical controller 82. The command from the elevator control unit 86 is input to a drive current supplier 67. The drive current supplier 67 outputs electric power according to the command, and thereby the elevator 62 of the cooling device 6 operates to raise and lower the mounting member 66. In this way, the cooling body 61 and the wiper 63 arranged on the mounting member 66 are raised and lowered. In addition, a signal according to the output of the drive current supplier 67 is input to the elevator control unit 86. The elevator control unit 86 performs feedback control based on the signal.

In addition, the numerical controller 82 controls the supply of the cooling medium to the pipeline 611 of the cooling body 61 by opening and closing the solenoid valve 68. When the solenoid valves 68 between the chiller and the cooling medium inlet 64 and between the chiller and the cooling medium outlet 65 are respectively opened, a flow of the cooling medium circulating between the chiller and the pipeline 611 is formed, and the temperature of the cooling body 61 is controlled to the cooling temperature. When the cooling of the cooling body 61 is not performed, the solenoid valve 68 is closed.

Furthermore, the numerical controller 82 controls the temperature control mechanism of the molding table 2. Specifically, the numerical controller 82 controls the molding table 2 to a desired temperature by appropriately turning on/off the heater and the cooler of the temperature control mechanism.

The irradiation controller 87 receives the molding program from the numerical controller 82, and generates irradiation data based on the molding program. Then, the irradiation controller 87 sends a command to the first mirror control unit 871$x$ and the second mirror control unit 871$y$ based on the generated irradiation data. In addition, the irradiation controller 87 sends a command to the output source 51 and controls the intensity of the laser beam L or the switching of on/off.

The first mirror control unit 871$x$ controls the scanner of the irradiator 5 based on a command from the irradiation controller 87. The command from the first mirror control unit 871$x$ is input to a drive current supplier 55$x$ of the irradiator 5. The drive current supplier 55$x$ outputs electric power according to the command, and thereby the actuator 56$x$ of the irradiator 5 operates and the galvano mirror 54$x$ rotates.

The second mirror control unit 871$y$ controls the scanner of the irradiator 5 based on a command from the irradiation controller 87. The command from the second mirror control unit 871$y$ is input to a drive current supplier 55$y$ of the irradiator 5. The drive current supplier 55$y$ outputs electric power according to the command, and thereby the actuator 56$y$ of the irradiator 5 operates and the galvano mirror 54$y$ rotates.

The lamination molding apparatus 1 of the embodiment is particularly effective in implementing a manufacturing method for three-dimensional molded object in which temperature control is performed on the solidified layer S during molding. As an example of this manufacturing method, in the embodiment, a lamination molding method is implemented in which molding is performed while the solidified layer S is heated and cooled under a predetermined temperature condition and thereby the martensitic transformation is intentionally advanced to perform stress control of the three-dimensional molded object. More specifically, every time one or more solidified layers S are newly molded, temperature control is performed on the newly formed solidified layer(s) S, that is, the upper surface layer in the order of the molding temperature, the cooling temperature, and the molding temperature. Hereinafter, operations related to the molding of the lamination molding apparatus 1 that implements this lamination molding method are described.

In the lamination molding method, the molding temperature and the cooling temperature satisfy the predetermined temperature condition for advancing martensitic transformation. That is, the molding temperature is equal to or higher than a martensitic transformation finish temperature of the solidified layer S. In addition, the cooling temperature is lower than the molding temperature and equal to or lower than a martensitic transformation start temperature of the solidified layer S. The molding temperature and the cooling temperature may not be constant during molding in the range satisfying this temperature condition. In other words, it is sufficient if the above temperature condition is satisfied every time the solidified layer S heated to the molding temperature is cooled to the cooling temperature. In addition, in order to prevent the martensitic transformation of the three-dimensional molded object from advancing after the molding, the cooling temperature may be set to be equal to or lower than the martensitic transformation finish temperature of the solidified layer S.

Figure 9:
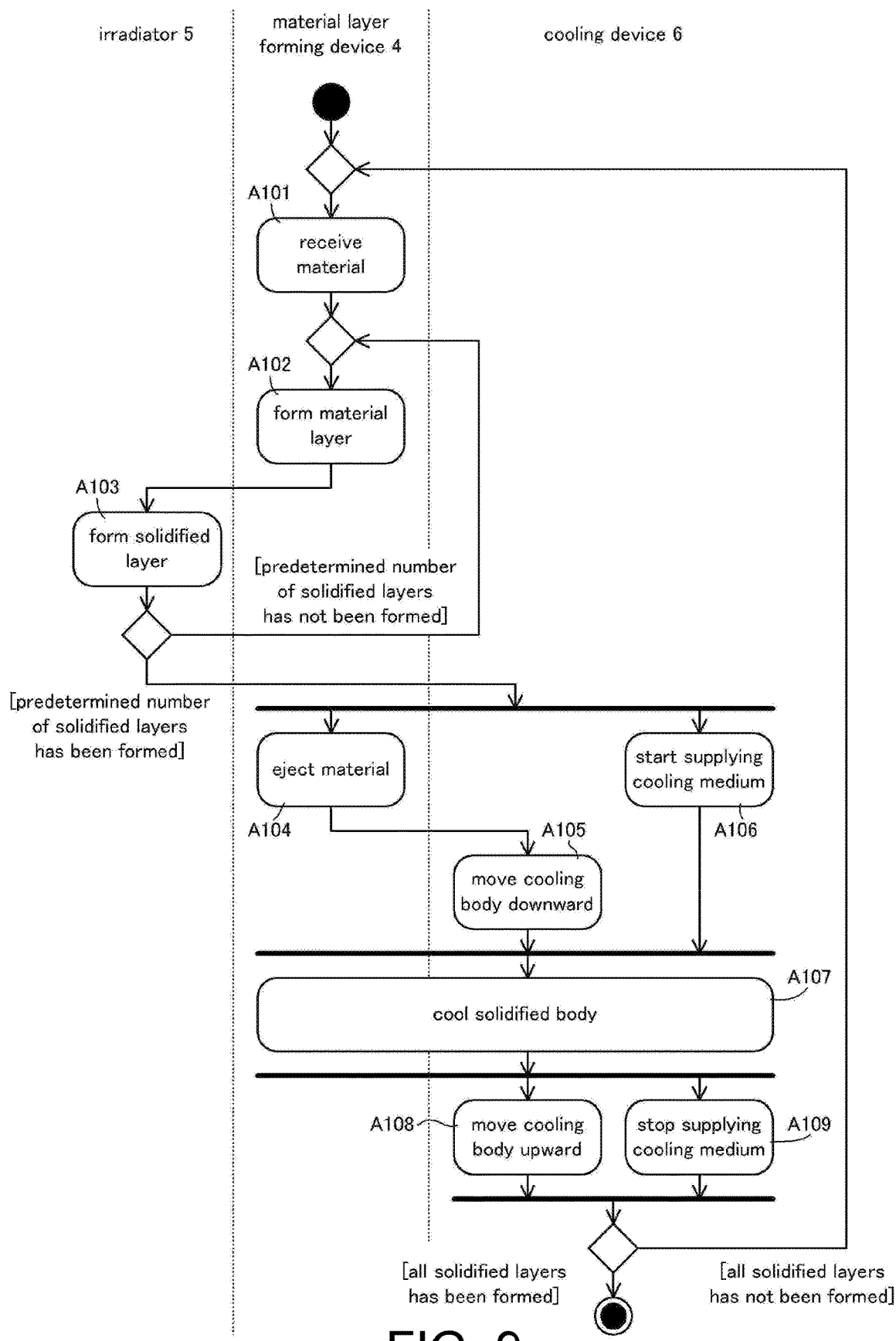
FIG. 9 is an activity diagram showing a flow of operations of the lamination molding apparatus.

FIG. 9 shows an example of a flow of operations of the lamination molding apparatus. First, the base plate 21 is placed on the molding table 2, and the molding table 2 is adjusted to an appropriate height. On the other hand, the recoater head 42 of the material layer forming device 4 moves below the material supplier 14 and receives the supply of the material powder from the material supplier 14 (A101). Subsequently, the recoater head 42 moves on the molding region R to form the first material layer M on the molding region R (A102). At this time, the molding table 2 is heated to a predetermined temperature by the temperature control mechanism arranged inside the molding table 2. Specifically, the molding table 2 is controlled to the molding temperature and preheats the material layer M.

Subsequently, the irradiator 5 operates to irradiate the first material layer M with the laser beam L to form the first solidified layer S (A103). After the first solidified layer S is formed, the molding table 2 is lowered by one layer of the material layer M, the recoater head 42 moves on the molding region R, and the second material layer M is formed on the solidified layer S. The irradiator 5 irradiates the second material layer M with the laser beam L, and the second solidified layer S is formed. In this way, the formation of the material layer M and the formation of the solidified layer S are repeated by a predetermined number. The molded plurality of solidified layers S is adhered to each other. At this time, the solidified layer S contains an austenite phase. Besides, when the material powder in the recoater head 42 is insufficient while the formation of the material layer M and the formation of the solidified layer S are repeated, the material powder may be supplied from the material supplier 14 again. In addition, while the formation of the material layer M and the formation of the solidified layer S are repeated, the temperature of the molding table is controlled to the molding temperature. That is, the molding table not only preheats the material layer M, but also sequentially controls the temperature of the formed solidified layers S to the molding temperature, that is, a temperature equal to or higher than the martensitic transformation finish temperature.

When the predetermined number of solidified layer(s) S is formed, the recoater head 42 moves onto the material collect opening 15, and discharges the material powder from the material discharge opening 423 to the material collect opening 15 to make the material container 421 substantially empty (A104). In this way, it is possible to prevent the material powder from being spread on the upper surface of the solidified body during cooling.

Subsequently, the recoater head 42 is moved to a predetermined position on the molding region R, and the elevator 62 lowers the cooling body 61 (A105). Besides, there is a possibility that protrusions are formed on the upper surface of the solidified body due to, for example, the attachment of spatters scattered when the laser beam L is irradiated on the upper surface of the solidified body. Therefore, in order to prevent the blade 424 and the protrusions from interfering with each other, it is desirable to lower the molding table 2 by a predetermined height in advance before moving the recoater head 42 onto the molding region R. In the embodiment, the molding table 2 is lowered by one layer of the material layer M.

In addition, in order to cool the cooling body 61 to a predetermined cooling temperature, the solenoid valve 68 is opened, the chiller supplies the cooling medium to the cooling device 6, and the cooling medium is caused to flow in the pipeline 611 (A106). It is desirable to start the flow of the cooling medium so that the cooling body 61 reaches the predetermined cooling temperature before the cooling body 61 comes into contact with the solidified body. In the embodiment, the flow of the cooling medium to the pipeline 611 is started at the timing when the predetermined number of solidified layer(s) S is formed. Besides, during cooling of the upper surface layer, heating of the molding table 2 performed by the temperature control mechanism arranged on the molding table 2 may be stopped. More preferably, the heater of the temperature control mechanism is stopped and the temperature of the molding table 2 is reduced by the cooler. At this time, the molding table 2 may be cooled to such an extent that excessive heat can be suppressed from being transferred to the solidified body, and the molding table 2 need not be cooled to the predetermined cooling temperature. For example, the temperature of the molding table 2 is controlled to room temperature.

In this state, the recoater head 42 moves on the molding region R, and the cooling body 61 which is the cooling roller rotates while being in contact with the upper surface of the solidified body and cools the upper surface layer (A107). By cooling the upper surface layer to the predetermined cooling temperature, at least a part of the austenite phase contained in the upper surface layer is transformed into a martensitic phase. The recoater head 42 reciprocates on the molding region R a plurality of times until the upper surface layer is sufficiently cooled. Besides, when the wiper 63 is arranged, it is desirable to wipe excess material powder from the upper surface of the solidified body and at least a part of the side surface of the solidified body before the cooling body 61 which is the cooling roller comes into contact with the upper surface of the solidified body. In the embodiment, as shown in FIGS. 1 and 5, the wiper 63 is arranged closer to the left side than the cooling body 61 which is the cooling roller. Therefore, during cooling, first, the recoater head 42 is controlled so as to move from the right side to the left side of the molding region R. After the material powder on the upper surface of the solidified body is removed by the wiper 63, the recoater head 42 may be moved in any direction. Besides, when the wipers 63 are arranged on both sides of the cooling body 61 which is the cooling roller, an initial movement direction of the recoater head 42 during cooling may be from the right side or the left side. Besides, the range in which the recoater head 42 moves during cooling may not include the entire molding region R. For example, the range of the upper surface of the solidified body may be calculated from the molding program for forming the uppermost solidified layer S at the time of cooling, and the recoater head 42 may be reciprocated only in the range. At this time, in order to remove the material powder on at least a part of the side surface of the solidified body by the wiper 63, it is desirable that the range in which the wiper 63 slides be larger than the range of the upper surface of the solidified body when the recoater head 42 moves on the solidified body at the beginning of each cooling. That is, it is desirable that the calculated range of the upper surface of the solidified body be added with a predetermined offset to become an initial movement range of the recoater head 42 during cooling. In addition, the cooling of the upper surface layer performed by the cooling device 6 may be performed until the temperature of the solidified layer surface reaches the cooling temperature, or may be performed until the recoater head 42 moves a predetermined number of times, or may be performed until a predetermined time elapses after the start of cooling. The number of movements of the recoater head 42 or the cooling time may be determined based on previously measured data, or may be calculated every time from the type of the material, the volume of the solidified layer or the upper layer, the area of the solidified layer surface, the molding temperature, the cooling temperature, and the like. In addition, the movement speeds of the recoater head 42 during cooling of the upper surface layer and during formation of the material layer M may be made different. For example, the movement speed of the recoater head 42 during cooling may be slower than the movement speed during formation of the material layer M.

When the cooling of the upper surface layer is completed, the elevator 62 raises the cooling body 61 (A108), the solenoid valve 68 is closed, the supply of the cooling medium performed by the chiller is stopped, and the flow of the cooling medium in the pipeline 611 is stopped (A109).

The recoater head 42 is replenished with the material powder by the material supplier 14, and the molding table 2 is reheated to the molding temperature. The temperature of the solidified body is controlled to the molding temperature via the molding table 2. Then, the formation of the material layer M and the formation of the solidified layer S are repeated in the same procedure as described above, and when the predetermined number of solidified layer(s) S is newly laminated, the solidified layer(s) S, that is, the upper surface layer is cooled again. The lamination molding apparatus 1 repeats these processing until the molding ends, and ends the molding operation when the desired three-dimensional molded object is manufactured. Besides, when the lamination molding apparatus 1 includes the first machining device or the second machining device, cutting may be performed on the solidified layer S during or after the molding.

Besides, a heating device including a heating body that is controlled to the molding temperature and comes into contact with the upper surface of the solidified body may be arranged on the recoater head 42, and the heating device may be used to heat the solidified body when the solidified body including the upper surface layer is controlled again to the molding temperature after the upper surface layer is cooled. The heating body of the heating device may be arranged separately from the cooling body of the cooling device 6, or the cooling body 61 may also function as a heating body. For example, when the cooling body 61 has the pipeline 611, the pipeline 611 may be configured so that the heating medium with temperature controlled to the molding temperature also flows. For example, a pipeline which is different from the pipeline 611 and through which the heating medium flows may be arranged inside the cooling body 61. In addition, for example, a roller different from the cooling body 61 equipped with the pipeline through which the heating medium flows may be arranged on the recoater head 42.

What is claimed is:

1. A lamination molding apparatus, comprising:
   a material layer forming device that forms a material layer in a molding region in which a desired three-dimensional molded object is formed;
   an irradiator that sinters or melts the material layer by irradiating a laser beam or an electron beam and forms a solidified layer; and
   a cooling device that cools, to a predetermined cooling temperature, at least a part comprising an upper surface of a solidified body obtained by laminating the solidified layer;
   wherein the material layer forming device comprises:
      a base having the molding region,
      a recoater head disposed on the base,
      a recoater head driving device that reciprocates the recoater head in a horizontal direction, and
      a blade that is arranged on the recoater head and that levels material powder to form the material layer;
   wherein the cooling device comprises:
      a cooling body having a cylindrical shape that is controlled to the cooling temperature and comes into contact with the upper surface of the solidified body,
      a mounting member that is configured to support the cooling body to be rotatable mounts the cooling body to the recoater head, and
      an elevator that raises and lowers the mounting member,
   wherein the cooling body rotates while being in contact with the upper surface of the solidified body, and
   the elevator is configured to raise and lower the cooling body by raising and lowering the mounting member, keep the cooling body and the material layer in a non-contact state when the material layer forming device forms the material layer, and keep the cooling body and the solidified body in a contact state when the cooling device cools the part comprising the upper surface of the solidified body.

2. The lamination molding apparatus according to claim 1,
   wherein the recoater head comprises:
      a material container that accommodates the material powder, and
      a material discharge opening that is arranged on a bottom surface of the material container and discharges the material powder.

3. The lamination molding apparatus according to claim 2,
   wherein a material collect opening that is an opening through which the material powder passes is formed on the base, and
   the recoater head moves onto the material collect opening and discharges the material powder in the material container before the cooling body comes into contact with the upper surface of the solidified body.

4. The lamination molding apparatus according to claim 1, wherein the cooling device further comprises a wiper that is arranged on the recoater head and removes the material powder from the upper surface of the solidified body.

5. The lamination molding apparatus according to claim 4, wherein the wiper is arranged on the recoater head via the mounting member.

6. The lamination molding apparatus according to claim 4, wherein a lower end of the wiper is located below a lower end of the cooling body.

7. The lamination molding apparatus according to claim 1, wherein the cooling body has a pipeline through which a cooling medium flows.

8. The lamination molding apparatus according to claim 1, wherein the cooling temperature is equal to or lower than a martensitic transformation start temperature of the solidified layer.

9. The lamination molding apparatus according to claim 8, wherein the cooling temperature is equal to or lower than a martensitic transformation finish temperature of the solidified layer.

\* \* \* \* \*